United States Patent
Baumann et al.

(10) Patent No.: US 6,428,038 B1
(45) Date of Patent: Aug. 6, 2002

(54) SIDE COLLISION DAMPING ARRANGEMENT FOR A VEHICLE

(75) Inventors: Karl-Heinz Baumann, Bondorf; Ultrich Bruhnke, Ehningen; Hans-Jürgen Mau, Sindelfingen; Michael Piesche, Jettingen, all of (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/644,535

(22) Filed: Aug. 24, 2000

(30) Foreign Application Priority Data

Aug. 24, 1999 (DE) .......................... 199 39 990

(51) Int. Cl.[7] .......................................... B60R 21/22
(52) U.S. Cl. .............................. 280/730.2; 280/743.2
(58) Field of Search .................. 280/728.1, 728.2, 280/730.1, 730.2, 743.2

(56) References Cited

U.S. PATENT DOCUMENTS

| 5,273,309 A | * | 12/1993 | Lau et al. ............... 280/730.1 |
| 5,324,072 A | | 6/1994 | Olson et al. |
| 5,382,051 A | | 1/1995 | Glance ..................... 280/751 |
| 5,447,326 A | | 9/1995 | Laske et al. ............. 280/728.3 |
| 5,752,713 A | * | 5/1998 | Matsuura et al. ......... 280/730.2 |
| 5,899,489 A | | 5/1999 | Jost ......................... 280/730.2 |
| 5,957,493 A | * | 9/1999 | Larson et al. ............. 280/743.1 |
| 5,975,566 A | * | 11/1999 | Bocker et al. ............ 280/730.2 |
| 6,059,311 A | * | 5/2000 | Wipasuramonton et al. ........................ 280/729 |
| 6,082,761 A | * | 7/2000 | Kato et al. ................ 280/730.2 |
| 6,237,943 B1 | * | 5/2001 | Brown et al. ............. 280/730.2 |

FOREIGN PATENT DOCUMENTS

| DE | 9111206 | 2/1992 |
| DE | 9207774 | 2/1993 |
| DE | 4320147 | 1/1994 |
| DE | 19604014 | 7/1997 |
| DE | 29702797 | 7/1997 |
| DE | 199 28 784 | 12/1999 |
| EP | 0 644 088 | 3/1995 |
| EP | 0 673 808 | 9/1995 |
| JP | 3-276844 | 12/1991 |
| JP | 5-338513 | 12/1993 |

\* cited by examiner

*Primary Examiner*—Brian L. Johnson
*Assistant Examiner*—Faye M. Fleming
(74) *Attorney, Agent, or Firm*—Crowell & Moring, LLP

(57) ABSTRACT

A side-impact damping device for a vehicle is provided for arrangement in an area of a B-column of the vehicle. A panel faces the vehicle occupants, and an airbag is present between the panel and the vehicle body. A sensor unit activates the airbag in the event of a side impact. The vehicle occupants sitting on the impact side are impacted with an acceptable force through the activated airbag and as a result are accelerated in the direction of the center of the vehicle.

13 Claims, 2 Drawing Sheets

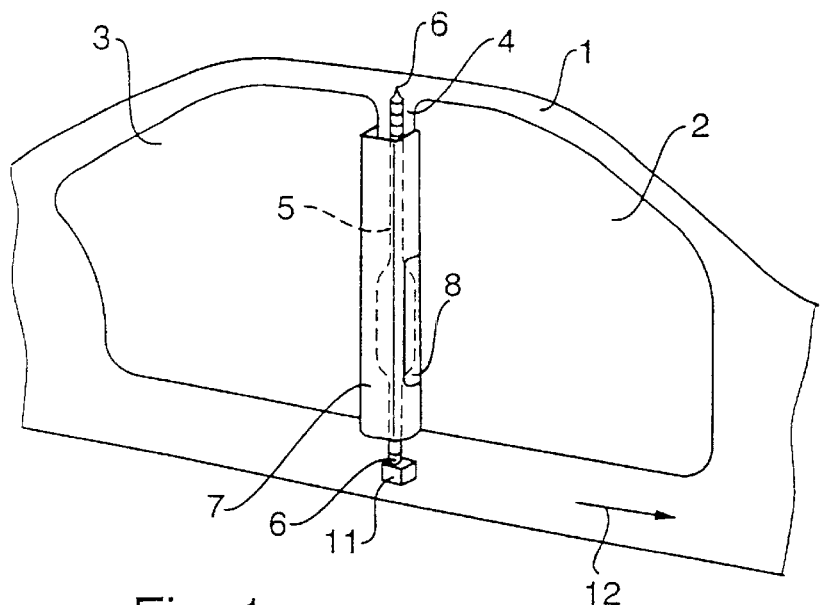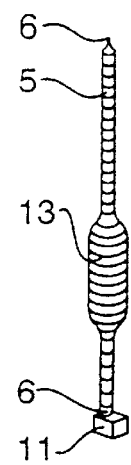
Fig. 1
Fig. 1a
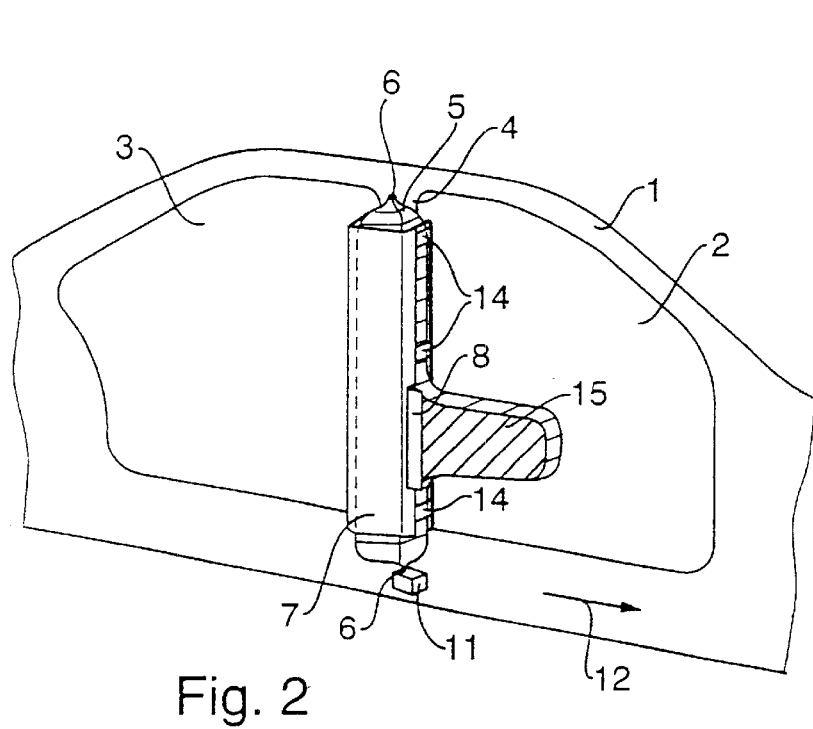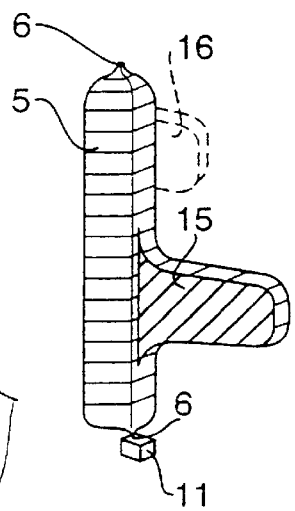
Fig. 2
Fig. 2a

US 6,428,038 B1

SIDE COLLISION DAMPING ARRANGEMENT FOR A VEHICLE

BACKGROUND AND SUMMARY OF THE INVENTION

The invention concerns a side-impact damping device for a vehicle, more particularly for arrangement in the area of the B-column of a vehicle, with a panel turned toward the occupants of the vehicle, with an airbag present between the panel and the vehicle body, and with a sensor unit which triggers the airbag in the event of a side impact.

Currently known side-impact damping devices are situated in the doors, in the backrests, or in the area of the B-column of the vehicle. Side-impact damping devices in the doors have the drawback that with the small clearance between the B-column and the vehicle occupants, the release time is not adequate to be able to develop sufficient damping effect in the space between B-column and vehicle occupants. In addition, the accommodation of such side-impact damping devices in the vehicle doors in some circumstances is unfavorable since relatively little clearance is present in the vehicle doors as a result of the components present there such as to door lock mechanisms, window raising devices, or loudspeaker systems. Furthermore, the side-impact damping device must bridge relatively greater distances before the actual effective zone is reached.

While side-impact damping devices in the seats, more particularly airbags present in the seats, are located closer to the vehicle occupants, they nevertheless have only limited effectiveness between the vehicle occupants and the passenger compartment surrounding the vehicle occupants.

Side-impact damping devices which are present as airbags on the B-column of vehicles are known by way of example from German Patent Document DE 91 11 206 U1. It is a drawback, however, that between the vehicle occupants and the B-column there is relatively little intervening space for the unfolding of an airbag arranged on the B-column so that in the event of a side impact of the vehicle only relatively little impact energy can be damped through such a side-impact damping device.

The present invention therefore is based on the object of creating a side-impact damping device through which the vehicle occupants are optimally protected and a side impact on a vehicle is optimally damped.

To solve the object, a side-impact damping device of the type described above is proposed which provides that the vehicle occupants sitting on the impact side are acted upon with acceptable force by the activated airbag and are accelerated thereby toward the middle of the vehicle.

As a result it is advantageously achieved that the vehicle occupants as a result of the activating airbag are acted upon with a force acting in the same direction as the impact force acts on the vehicle. Thus in the event of a side impact of the vehicle a jolt-like acceleration of the occupants of the vehicle is counteracted as a result of their inertia. In addition, the occupants of the vehicle are brought away from the impact zone of the foreign body hitting the vehicle as a result of which additional penetration paths for the foreign body penetrating into the vehicle are created.

The invention also has the advantage that while claiming relatively little room, an effective impact behavior and an associated effective side-impact damping device of the vehicle are ensured.

According to one configuration of the invention, in the event of an activated airbag, the panel is present between the vehicle occupants and the airbag. As a result it is advantageously achieved that upon activation of the airbag, the panel does not have to be moved away as being in the way.

Another configuration of the invention provides that the panel and the airbag are configured as one piece. Such a configuration is particularly cost effective and ensures a secure connection between the panel and the activated airbag.

According to another further development of the invention, the panel is configured as a distributor element adapted in particular to the human body that the force acting on the vehicle is favorably distributed when the airbag is released. In this manner, the impact of the panel on the human body is uniform and thus is acceptable.

A variant of the invention provides that the panel pads the hips, torso, shoulders, and head of the occupants of the vehicle. As a result, the impact on the vehicle is better damped with the airbag, resulting in a softer impact of the panel.

According to a further development of the invention, when the airbag is activated, the panel is retained in a defined end position with retaining elements, with the retaining elements preventing the panel or the airbag from penetrating too far into the passenger compartment.

One embodiment of the invention provides that the retaining elements are more particularly retaining straps, one end of which is fastened to the vehicle body and the other end of which is fastened to the panel. As a result of a defined length of the retaining straps a controlled movement sequence of the panel into the passenger compartment is ensured. It is also contemplated in certain preferred embodiments for the retaining straps to be configured to be elastic or semi-elastic to better and more uniformly damp the impact acting on the vehicle occupants as a result of the airbag. In the case of several side-impact damping devices in a vehicle, the individual side-impact damping devices can by way of example have retaining straps of differing lengths depending on what distance must be overcome between the vehicle and the vehicle occupants.

One variant of the invention provides that the airbag extends like a tube over largely the entire height of the passenger compartment and is attached in the area of the vehicle roof and the vehicle floor to the vehicle body. Such a configuration has the advantage that the entire height of the passenger compartment is covered by the airbag which in particular results in a uniform impact and acceleration of the corresponding vehicle occupants.

Another further development of the invention provides that the airbag in activated condition has sections which extend into the passenger compartment, more particularly in the direction of travel and the opposite direction, and are provided for cushioning the vehicle occupants, in particular their rib and/or head area. As a result of the presence of such sections, the airbag can cover additional areas within the passenger compartment which represents additional protection for the passengers.

According to a further development of the invention, the panel has sections which can open in particular in the direction of travel and the opposite direction through which the sections of the activated airbag penetrate into the vehicle compartment. As a result of the presence of such sections in the panel which can open, it is ensured that the corresponding sections of the activated airbag can act in the desired zones of action despite the presence of the panel.

According to certain preferred embodiments of the invention, the sections capable of opening are flap elements opened up in the manner of a hinge. Such flap elements have the advantage that they can be opened very early and the airbag area or the airbag section lying under it can unfold completely.

A variant of the invention provides that the side-impact damping devices are present in the B-column and/or a vehicle door. Specifically the combination of several side-impact damping devices according to the invention, in particular in the B-column and in the vehicle doors, offers optimal protection of the vehicle occupants in the event of a side impact.

Other advantages, features, and details of the invention will be found in the description below in which a number of embodiments of the invention are described in detail with reference to the drawings. The features referred to in the claims and the specification may be important to the invention individually or in any combination.

BRIEF DESCRIPTION OF THE DRAWINGS

FIG. 1 shows a schematic representation of a side wall of a passenger compartment, including an airbag assembly constructed according to preferred embodiments of the invention;

FIG. 1a depicts the airbag and gas generator of FIG. 1, in an uninflated condition;

FIG. 2 shows the representation according to FIG. 1 with an activated airbag;

FIG. 2a depicts the airbag and gas generator of FIG. 1a in inflated condition;

DETAILED DESCRIPTION OF THE DRAWINGS

Figure 3A:
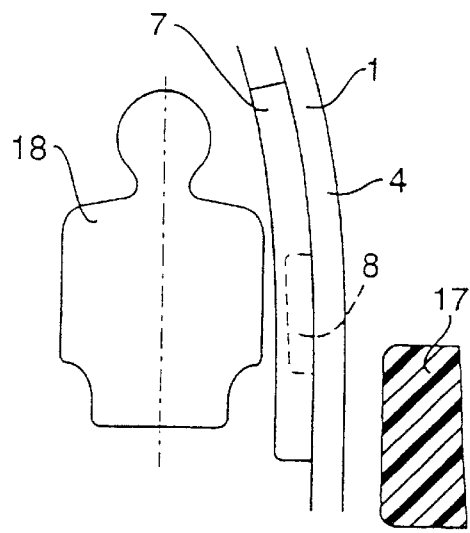
FIGS. 3a–3c show the passenger compartment side wall and airbag assembly of FIG. 1 with a vehicle occupant shown in cross section during various stages of a side impact.

FIG. 1 shows the interior of a vehicle passenger compartment side wall 1 with a driver door cutout 2 and a rear door section 3. Between rear door section 3 and driver door cutout 2, a B-column 4 is present. Arranged on B-column 4 is a tube-like airbag 5 via two fastening points 6. Tube-like airbag 5 is covered in the direction of the passenger compartment by a panel 7. On its side toward driver door cutout 2, panel 7 has a flap element 8 which can be opened up. In FIG. 1, a gas generator 11 is in addition connected to tube-like airbag 5 which in the event of a side impact explosively fills airbag 5 with gas. The direction of travel of the vehicle is indicated by an arrow 12.

In FIG. 1a is depicted tube-like airbag 5 with associated gas generator 11 as an individual element, as a result of which a widening 13 present in the middle area of airbag 5 can be clearly discerned.

In FIG. 2, airbag 5 is shown in activated condition. Panel 7 with retaining elements, specifically retaining straps 14, is retained in a defined end position. Retaining straps 14 are fastened on one end to the vehicle body, more particularly, B-column 4 and on their other end to panel 7.

In FIG. 2 it can be clearly seen that airbag 5 in activated condition has a section 15 which extends into the passenger compartment in the direction of travel 12. Section 15 serves in particular to cushion the rib area of the vehicle occupants. In FIG. 2 it can also be clearly seen that flap element 8 as a result of the unfolding of section 15 of airbag 5 is opened.

It is also contemplated in certain embodiments for flap element 8 to extend over the entire length of panel 7 as a result of which a larger area of the passenger compartment can be covered by section 15.

In the FIG. 2a, in which activated airbag 5 is depicted for clarity as an individual element, it is indicated that an additional section 16 can be provided for the protection of the head area of the passengers.

It is also contemplated according to certain embodiments that section 15 or 16 can also be present in the direction opposite to the direction of travel 12 for the protection of the vehicle occupants in the rear compartment of the vehicle.

Figure 3B:
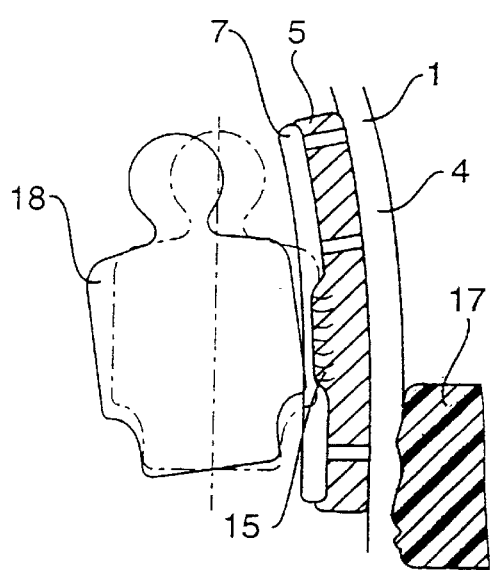
Figure 3C:
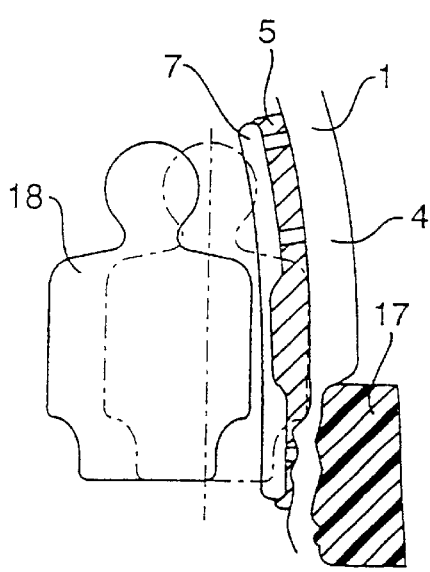

In FIGS. 3a–3c, in which a foreign body 17 is hitting the side wall 1 of the passenger compartment, three individual conditions 3a, 3b, and 3c of the impact are depicted. In the depiction of FIG. 3a, there is not yet any contact of foreign body 17 with the vehicle or side wall 1 of passenger compartment. Clearly discernable are a vehicle occupant 18, between whom and B-column 4 or panel 7 clearance is present. In the depiction of FIG. 3a, flap element 8 is also indicated.

The depiction of FIG. 3b shows the collision of foreign body 17 with the side wall of the vehicle compartment 1. It can be clearly seen how airbag 5—which in the depiction of FIG. 3a is present out of sight behind panel 7—in the depiction of FIG. 3b pushes panel 7 explosively in the direction of the middle of the vehicle, airbag 5 being activated by a not-depicted sensor unit which can be more particularly an acceleration sensor and/or an impact fuse. As a result of activated airbag 5, vehicle occupant 18 is impacted by an acceptable force through which he is accelerated in the direction of the center of the vehicle. To make the change of position caused by airbag 5 clear, vehicle occupant 18 is drawn in dashed lines in his initial position and with a solid line in the end position arrived at after the depiction of FIG. 3b. Advantageously panel 7 is configured as a distribution element which favorably distributes the force acting upon the vehicle occupants 18 in the event of activated airbag 5. In addition it can be provided that panel 7 provides cushioning which cushions the hips, torso, shoulders, and head of the vehicle occupant 18. In the depiction of FIG. 3b, section 15 is also depicted which protects in particular the rib area of vehicle occupants 18.

In the depiction of FIG. 3c, the foreign body 17 has penetrated further into the side wall of the passenger compartment. It can be clearly seen that the vehicle occupant 18 is in a position closer to the center of the vehicle as a result of the acceleration caused by activated airbag 5, which is made clear through the solid line of vehicle occupant 18 in comparison to his starting position, which is indicated by the dashed line.

It is clear from FIGS. 3a–3c that vehicle occupant 18 as a result of airbag 5 which is being activated is accelerated in the same direction as the force acting on the vehicle as a result of foreign body 17. In addition, vehicle occupant 18 is brought away from the impact zone of foreign body 17, as a result of which an additional possible penetration path for foreign body 17 which is penetrating into the vehicle is formed. In this manner, optimal safety of vehicle occupant 18 is ensured.

All features represented in the description, the claims below, and drawings can be important to the invention both individually or in any combination with each other.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Side-impact damping device for a vehicle which is capable of being arranged in an area of a B-column of the vehicle, with a panel facing vehicle occupants, with an airbag present between the panel and the vehicle body, and with an activating sensor unit for the airbag in the event of a side impact, wherein the side impact damping device is arranged such that during the side impact the vehicle occupants sitting on the impact side are adapted to be acted upon as a result of an activated airbag with an acceptable force and as a result are accelerated in a direction towards a center of the vehicle, and wherein the panel is adapted to be present between the vehicle occupants and the airbag with an activated airbag and is configured as a distribution element having a stiffness which distributes the force acting upon the vehicle occupants when the airbag has been activated, the panel being provided with at least one cushion which is arranged to cushion at least one of the hips, torso, shoulders, and head of the vehicle occupants.

2. Side-impact damping device according to claim 1, wherein the panel and the airbag are configured as one piece.

3. Side-impact damping device according to claim 1, wherein, with an activated airbag, the panel is retained in a defined end position with a plurality of retaining elements.

4. Side-impact damping device according to claim 3, wherein the retaining elements are retaining straps, one end of which retaining straps is fastened to the vehicle body and the other end of which is fastened to the panel.

5. Side-impact damping device according to claim 1, wherein the airbag in activation condition has sections which extend into the passenger compartment in a direction of travel and an opposite direction, and are arranged to cushion the vehicle occupants in at least one of their rib and head areas.

6. Side-impact damping device according to claim 5, wherein the panel has sections which open in the direction of travel and the opposite direction, through which portions of the activated airbag penetrate into the passenger compartment.

7. Side-impact damping device according to claim 6, wherein the sections capable of opening are flap elements which swing open.

8. Side-impact damping device according to claim 1, wherein the side-impact damping device is present in the B-column and/or a vehicle door.

9. A passenger vehicle body assembly comprising:

a vehicle body B-column, a panel facing toward a vehicle passenger space in an area of the B-column, a side airbag interposed between the panel and adjacent vehicle body structure in the area of the B-column, and an activation sensor operable to inflate the airbag and push the panel with an acceptable force against a passenger away from the B-column area toward a center of the passenger space in the event of a side-impact collision, wherein the panel is adapted to be present between the vehicle occupants and the airbag with an activated airbag and is configured as a distribution element having a stiffness which distributes the force and operable to act upon the vehicle occupants when the airbag has been activated, the panel being provided with at least one cushion with is arranged to cushion at least one of the hips, torso, shoulders, and head of the vehicle occupants.

10. An assembly according to claim 9, wherein, with an activated airbag, the panel is retained in a defined end position with retaining elements.

11. An assembly according to claim 10, wherein the retaining elements are retaining straps, one end of the retaining straps being fastened to the vehicle body and the other end being fastened to the panel.

12. A passenger vehicle body assembly comprising:

a vehicle body B-column, a panel facing toward a vehicle passenger space in an area of the B-column, a side airbag interposed between the panel and adjacent vehicle body structure in the area of the B-column, and an activation sensor operable to inflate the airbag and push the panel with an acceptable force against a passenger away from the B-column area toward a center of the passenger space in the event of a side-impact collision, wherein, with an activated airbag, the panel is retained in a defined end position with retaining elements, wherein the retaining elements are retaining straps, one end of the retaining straps being fastened to the vehicle body and the other end being fastened to the panel, and wherein the airbag extends tube-like over largely an entire height of a vehicle passenger compartment and is fastened in an area of a vehicle roof and in an area of a vehicle floor to the vehicle body.

13. An assembly according to claim 12, wherein the airbag in activation condition has sections which extend into the passenger compartment in a direction of travel and an opposite direction, and are arranged to cushion the vehicle occupants in at least one of their rib and/or head areas.

* * * * *